(12) United States Patent
Paauwe et al.

(10) Patent No.: US 7,220,934 B2
(45) Date of Patent: May 22, 2007

(54) METHOD OF PRODUCING COOLING HOLES IN HIGHLY CONTOURED AIRFOILS

(75) Inventors: Corneil Paauwe, Manchester, CT (US); Matthew Devore, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 33 days.

(21) Appl. No.: 11/146,737

(22) Filed: Jun. 7, 2005

(65) Prior Publication Data

US 2006/0273073 A1 Dec. 7, 2006

(51) Int. Cl.
*B23H 1/04* (2006.01)
*B23H 9/10* (2006.01)
*B23H 9/14* (2006.01)

(52) U.S. Cl. .................. 219/69.15; 219/69.17
(58) Field of Classification Search ........... 219/69.15, 219/69.17; 416/97 R; 415/115
See application file for complete search history.

(56) References Cited

U.S. PATENT DOCUMENTS

| 4,197,443 A * | 4/1980 | Sidenstick ............ 216/69.15 |
| 4,653,983 A * | 3/1987 | Vehr ..................... 416/97 R |
| 4,684,322 A | 8/1987 | Clifford et al. |
| 4,767,268 A | 8/1988 | Auxier et al. |
| 4,769,118 A | 9/1988 | Johns |
| 4,922,076 A * | 5/1990 | Cross et al. .............. 219/69.15 |
| 5,281,084 A | 1/1994 | Noe et al. |
| 5,342,172 A * | 8/1994 | Coudray et al. .......... 416/97 R |
| 5,382,133 A * | 1/1995 | Moore et al. ................ 415/115 |
| 5,486,093 A | 1/1996 | Auxier et al. |
| 5,605,639 A | 2/1997 | Banks et al. |
| 5,637,239 A | 6/1997 | Adamski et al. |
| 5,893,984 A * | 4/1999 | Thompson ................ 219/69.15 |
| 6,164,912 A | 12/2000 | Tabbita et al. |
| 6,339,879 B1 | 1/2002 | Wheat et al. |
| 6,354,797 B1 * | 3/2002 | Heyward et al. ......... 416/97 R |
| 6,380,512 B1 | 4/2002 | Emer |
| 6,427,327 B1 | 8/2002 | Bunker |
| 6,491,496 B2 * | 12/2002 | Starkweather ............. 416/97 R |
| 6,609,891 B2 * | 8/2003 | Leeke et al. ............... 416/97 R |
| 6,611,731 B2 | 8/2003 | Duffin |
| 6,717,095 B2 | 4/2004 | Arness et al. |
| 6,800,829 B1 | 10/2004 | Nimmons |
| 6,830,432 B1 * | 12/2004 | Scott et al. ................ 416/97 R |
| 6,945,750 B2 * | 9/2005 | Benedetti et al. ........... 415/115 |
| 2006/0104807 A1* | 5/2006 | Lee ............................ 415/115 |

* cited by examiner

*Primary Examiner*—Geoffrey S. Evans
(74) *Attorney, Agent, or Firm*—Carlson, Gaskey & Olds

(57) ABSTRACT

An EDM electrode curved in both the the Z and the Y planes permits the formation of film cooling holes in a highly contoured article.

11 Claims, 5 Drawing Sheets

METHOD OF PRODUCING COOLING HOLES IN HIGHLY CONTOURED AIRFOILS

This invention was made with government support under Contract No.: N00014-02-C-3003 awarded by the Department of the Navy. The government therefore has certain rights in this invention.

BACKGROUND OF THE INVENTION

The present invention relates to forming holes in articles, such as gas turbine engine components, and more particularly to an electrode for use in an electrical discharge machining (EDM) device.

Gas turbine engines operate at extremely high temperatures for increased efficiency. Stationary vanes, disposed between rings of moving blades within the turbine section of the engine direct and stabilize high temperature gas flow from one stage of moving blades to the next. Direct exposure to this high temperature gas, however, detrimentally affects the vanes and blades by causing component distortion and even melting in extreme cases.

Internal cooling techniques have been developed to maintain the temperature of the blades and vanes within design limits while operating at high temperatures. The outer surface of engine components is typically cooled with high pressure cooling air from the compressor section of the engine to provide film cooling. In this method, a layer of cool air is flowed between the high temperature gases and the external surfaces of the engine components. The layer of cooling air is formed by passing the cooling air through a series of small holes in the component which are formed in a predetermined pattern. The resulting film of air reduces component surface temperature thereby deterring component distortion. Engine efficiency is also increased because higher turbine inlet temperature ranges are possible.

Many processes exist to form cost effective, high quality cooling holes in gas turbine engine components. One such process is electrical discharge machining (EDM). EDM is a well-known process for producing holes or other openings in metals in which current discharges are utilized to erode metal. For example, by pulsing a direct current between a positively charged work piece (anode) and a negatively charged electrode (cathode), a spark discharge is produced. The current occurs when the potential difference between the electrode and the work piece, both in contact with a dielectric fluid, is great enough to breakdown the dielectric fluid and produce an electrically conductive channel. Upon application of a voltage, a current flow results with enough heat energy to melt and erode the work piece. This process has application in the machining of small, deep, odd-shaped holes which are cumbersome, if not impossible, to produce by other means.

A conventional EDM method for producing diffusion holes in engine components uses a planar copper electrode or "EDM comb" which is typically manufactured by stamping and coining. The teeth of the electrode are small diameter elongated ends that form a hole shape defined by electrode, with allowance for electrode overburn and EDM electrode erosion.

Although the above EDM method is successful, limitations exist. One such limitation is that conventional planar EDM combs are constrained to a straight line of holes, which are only applicable to a relatively straight airfoil sections.

Accordingly, it is desirable to provide an EDM electrode which can produce high quality holes which can be applied to highly contoured airfoil sections of an airfoil in an efficient and effective manner.

SUMMARY OF THE INVENTION

An EDM electrode according to the present invention includes a first multitude of electrode teeth and a second multitude of electrode teeth which extend from an electrode base. The multitudes of electrode teeth defined within a Y-plane are of varying length. The second multitude of electrode teeth are curved relative the first multiple of electrode teeth to generally follow a contour of a highly contoured work piece, such as an airfoil section. The second multitude of electrode teeth are also curved in the Z-plane relative the first multiple of electrode teeth to further follow a contour of the highly contoured work piece (e.g., airfoil section). An electrode holder base maintain the EDM electrode in alignment about the X and Y planes while mainiting the curvature relative to the Z-plane.

The present invention therefore provides an EDM electrode which can produce high quality holes which can be applied to highly contoured work pieces, such as airfoil sections of an airfoil, in an efficient and effective manner.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
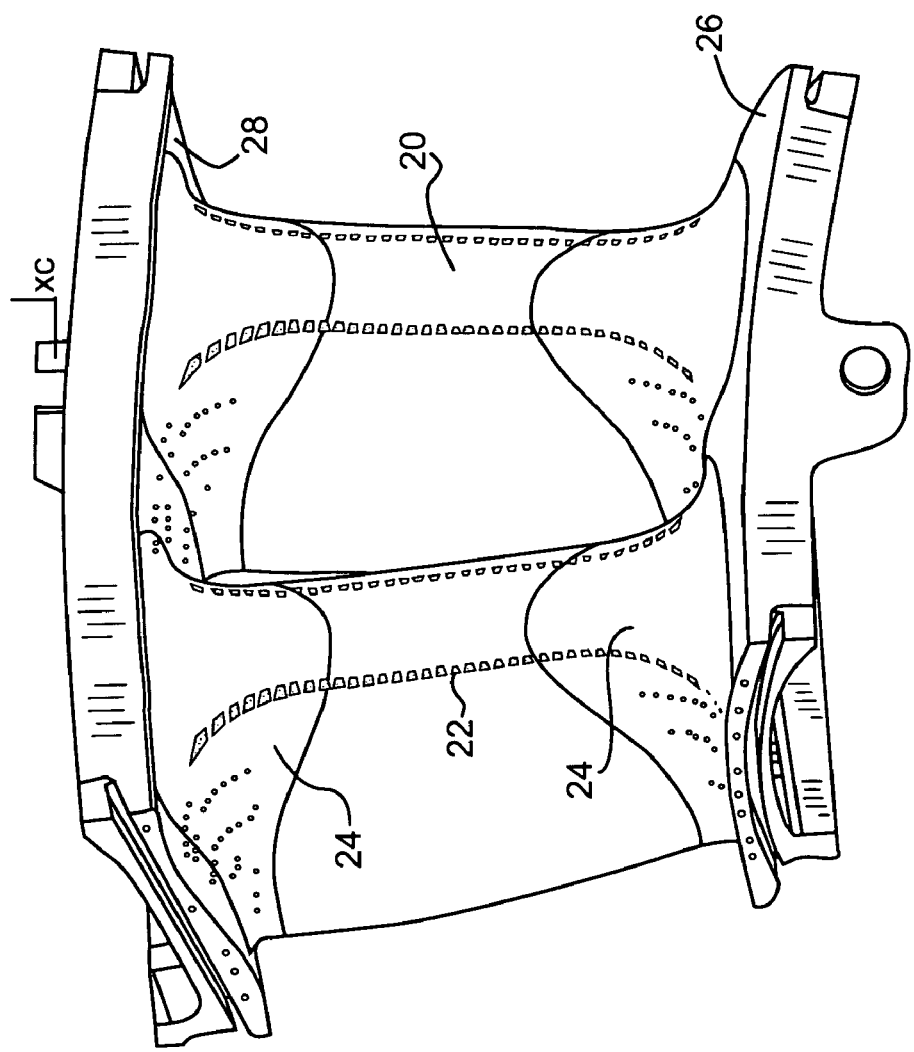
FIG. 1 is a general perspective view an exemplary airfoil section for use with the present invention.

FIG. 1 illustrates a general perspective view of an exemplary article, namely a hollow turbine stator 20 (work piece) with diffusion holes 22 in airfoil section 24. With the assistance of the present invention, the diffusion holes 22 can reside in highly contoured regions of the airfoil section 24, such as a fillet adjacent a stator inner section 26 and stator outer section 28. "Highly" contoured as utilized herein is defined as those areas that typically bridge an airfoil surface with the shroud or a curved section of the airfoil body. It should be understood that although an airfoil surface is illustrated in the disclosed embodiment, any somewhat contoured article in which EDM holes are desired will also benefit from the present invention. Cooling air enters the internal cavity of the stator 20 typically through an opening in the root as generally understood to those of ordinary skill in the art. The internal surface of the stator 20 is cooled by convection while the outer surface is cooled through film cooling from air exiting the diffusion holes 22. The ability to form diffusion holes 22 in the highly contoured regions of airfoil sections 24 as a result of the present invention permits the supply film cooling on sections that otherwise are not cooled which results is a more durable airfoil which withstands higher tempreratures. It should be understood that although the workpiece disclosed in the illustrative embodiment is a stator, other work pieces, including airfoil shaped components, will also benefit from the present invention.

By way of illustration, which is meant to be exemplary rather than limiting, the present invention will be described by the electrical discharge machining (EDM) of diffusion holes. In as much as it is well known in the art to form the diffusion holes in gas turbine engine components by means of EDM, specific details of the process need not be described herein.

Figure 2A:
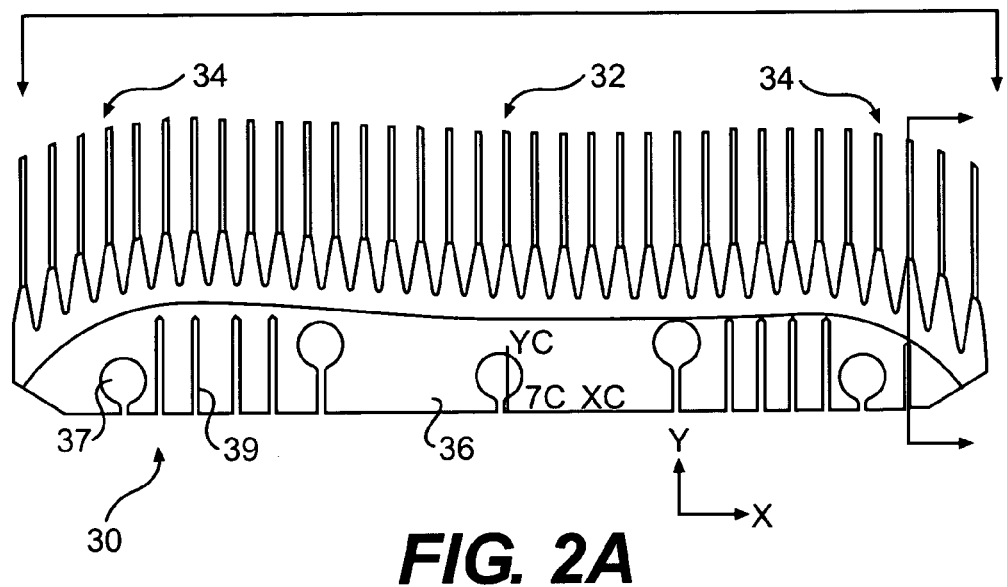
FIG. 2A is a planar view of an EDM electrode of the present invention.

Referring to FIG. 2A, an EDM electrode 30 includes a first multitude of electrode teeth 32 and a second multitude of electrode teeth 34 which extend from an electrode base 36. The multitudes of electrode teeth 32, 34 form a "comb" like structure. The multitude of electrode teeth 32, 34 may be manufactured from any conductive material and are preferably manufactured from copper since it is relatively inexpensive and receptive of operations such as stamping and coining into a desired shape.

In one embodiment, the first multiple of electrode teeth 32 are preferably located along a central portion of the EDM electrode 30 and are flanked on both sides by the second multitude of electrode teeth 34. That is, the second multitude of electrode teeth 34 are located on each side of the first multitude of electrode teeth 32 within an X-plane. It should be understood that other embodiments are possible.

The multitudes of electrode teeth 32, 34 are defined within a Y-plane and are of varying length. The second multitude of electrode teeth 34 define a length within the Y-plane relative to the first multiple of electrode teeth 32 to generally follow a contour of the highly contoured airfoil section 24 (FIG. 1). Variation within the Y-plane is preferably accomplished by machining the curvature into the face of the EDM electrode 30 though a milling operation. The perimeter of the electrode may also be produced by a wire cutting or stamping operation to produce the exterior shape. It should be understood that various curvatures and shapes will be usable with the present invention to assure that the second multitude of electrode teeth 34 penetrate a desired depth into the airfoil to assure formation of the diffusion holes.

Figure 2B:
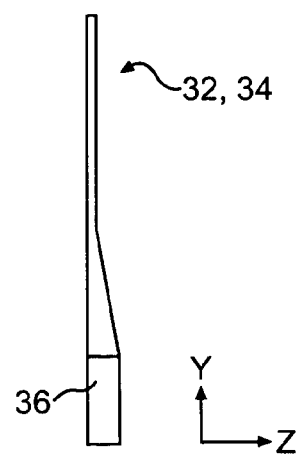
FIG. 2B is a side Y-plane view of the EDM electrode taken along line 2B—2B in FIG. 2A.
Figure 3:
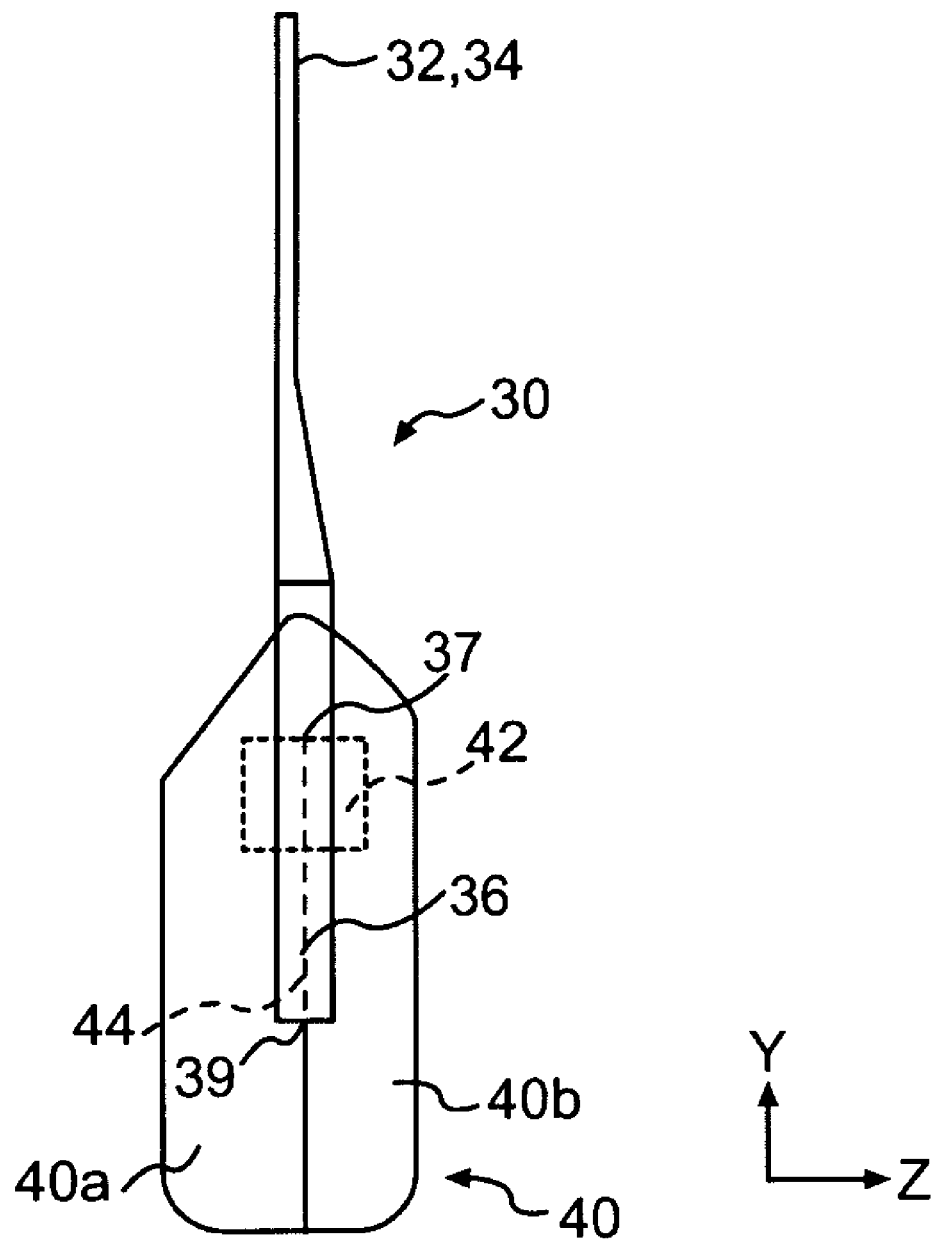
FIG. 3 is a side view of the EDM electrode taken along line 2B—2B in FIG. 2A and mounted in an electrode base.

The first multitude of electrode teeth 32 and the second multitude of electrode teeth 34 extend from the electrode base 36 which is preferably of a greater depth than the electrode teeth 32, 34 (FIG. 2B). That is, the base 36 is thicker and provides a more rigid support for the teeth 32, 34. The electrode base 36 preferably includes mounting pin apertures 37 and relief grooves 39 to facilitate mounting in an electrode holder base 40 (FIG. 3). It should be understood that teeth of various profiles (FIG. 2B) will be usable with the present invention.

The second multitude of electrode teeth 34 are also preferably curved in the Z-plane relative the first multiple of electrode teeth 32 (FIG. 2C) to further follow a contour of the highly contoured airfoil section 24 (FIG. 1). That is, the second multitude of electrode teeth 34 extend out of a Z-plane defined by the first multiple of electrode teeth 32.

Figure 2C:
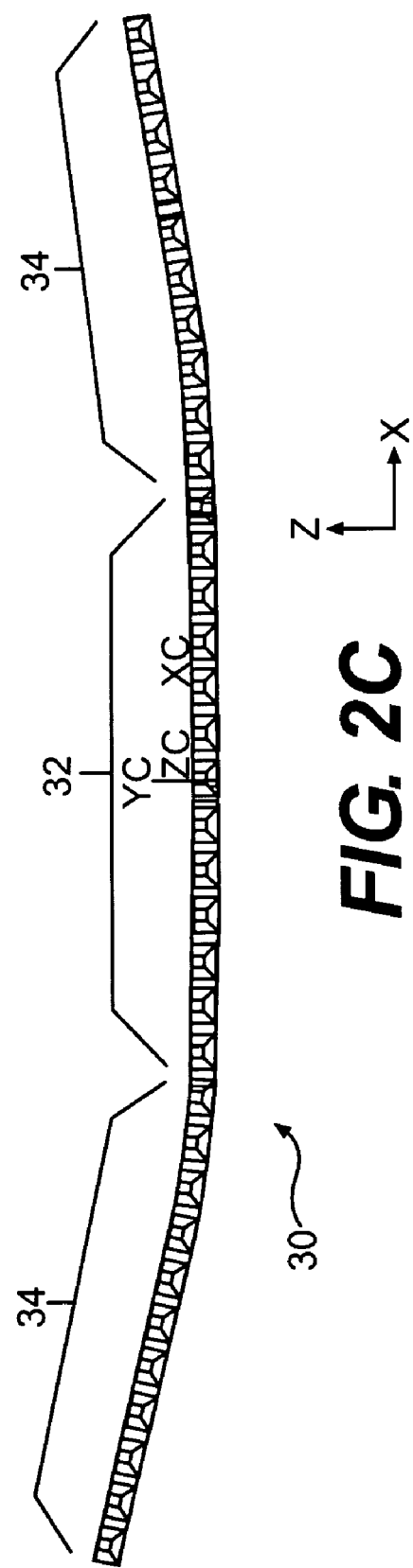
FIG. 2C is a front Z-plane view of the EDM electrode taken along line 2C—2C in FIG. 2A.

Referring to FIG. 3, the electrode holder base 40 includes an upper base portion 40a and a lower base portion 40b. The lower base portion 40b includes a multitude of mounting pins 42 which engage the mounting pin apertures 37. The mounting pins 42 maintain the EDM electrode 30 in alignment about the X and Y planes axis while the relief grooves 39 facilitate creating curvature of the EDM electrode 30 relative to the Z-plane (FIG. 2C).

The EDM electrode 30 is loaded into the base of the electrode holder such the EDM electrode is pressed into the shape of the electrode holder base 40. The upper base portion 40a essentially flexes the EDM electrode 30 into the shape of the electrode holder basse 40. Relief grooves 39 facilitates the flexing of the electrode into the shape of the holder. The electrode is finally clamped such that it maintains curvature. The upper base portion 40a and the lower base portion 40b are retained together through fasteners and/or clamps.

Figure 4:
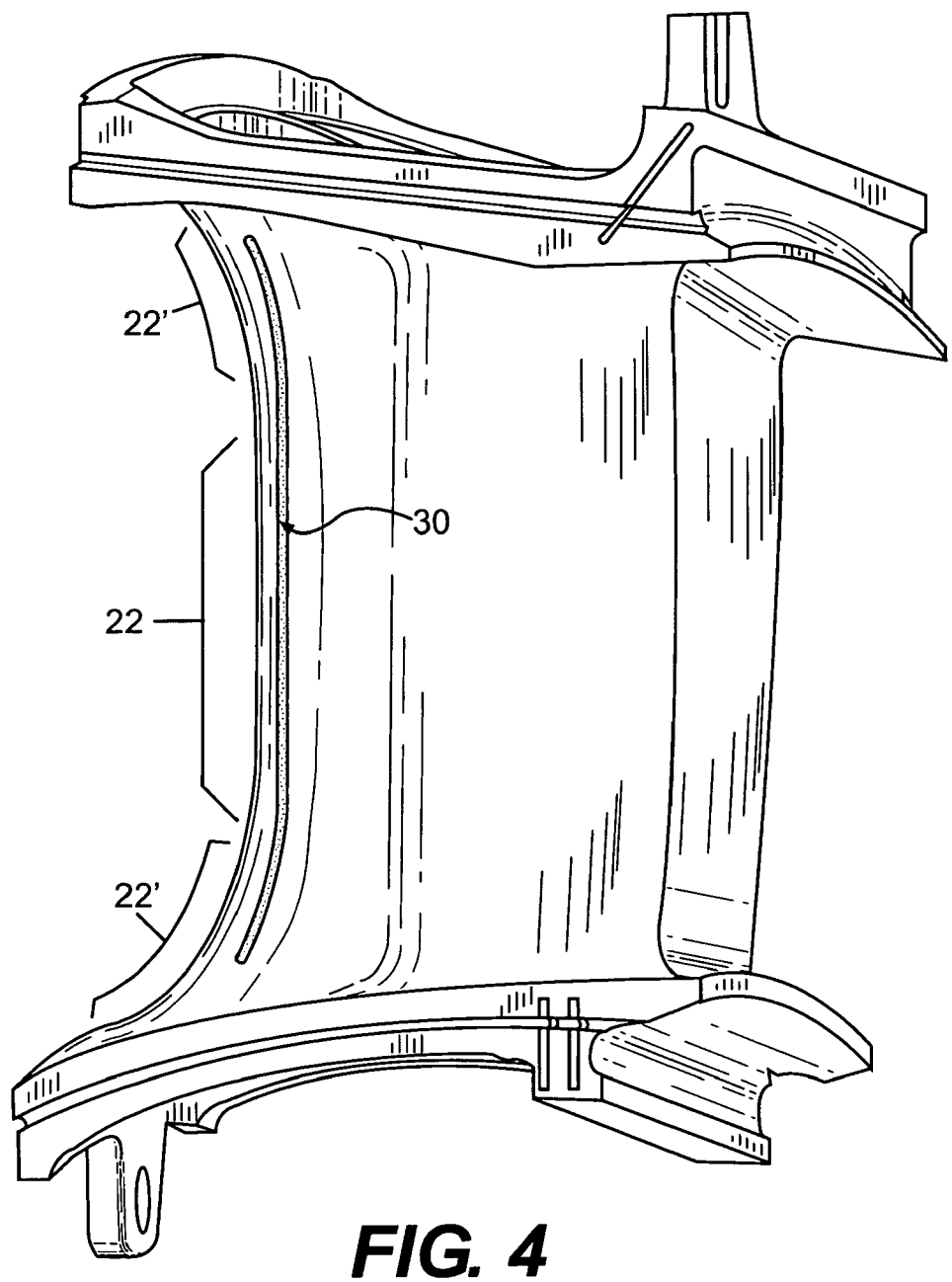
FIG. 4 is a perspective generally rear view of an exemplary airfoil section with the EDM electrode plunged into a highly contoured airfoil section.

Referring to FIG. 4, the EDM electrode is advanced (illustrated schematically) into the hollow turbine stator 20 adjacent a leading edge 20L in a conventional manner. As the schematically second multitude of electrode teeth 34 are contoured to match the highly contoured airfoil section 24, the EDM electrode 30 is advanced in a conventional manner such that diffusion holes 22 are formed in the highly contoured airfoil sections 24 (FIG. 1). That is, the first multitude of electrode teeth 32 form a generally linear group of diffusion holes 22 while the second multitude of electrode teeth 34 form a group of diffusion holes 22' offset from the diffusion holes 22 (FIG. 1).

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An electrical discharge machining electrode comprising:
   an electrode base;
   a first multitude of teeth and a second multitude of teeth which extend from said electrode base, said first multitude of teeth are of generally equivalent length and said second multitude of teeth define a curvature relative said first multitude of teeth.

2. The electrical discharge machining electrode as recited in claim 1, wherein said base defines a multiple of mounting openings to retain said electrode within a holder.

3. The electrical discharge machining electrode as recited in claim 1, wherein said second multitude of teeth define a curvature in a Y-plane relative to said first multitude of teeth.

4. An electrical discharge machining electrode comprising:
   an electrode base;
   a first multitude of teeth and a second multitude of teeth which extend from said electrode base, at least one of said second multitude of teeth having a length variation relative to at least one of said first multitude of teeth, wherein said first multitude of teeth are located within a Z-plane and said second multitude of teeth extend out of said Z-plane.

5. An electrical discharge machining electrode comprising:
   an electrode base;
   a first multitude of teeth and a second multitude of teeth which extend from said electrode base, at least one of said second multitude of teeth having a length variation relative to at least one of said first multitude of teeth, further comprising a holder which receives said electrode base to maintain said first multitude of teeth within a Z-plane and maintain said second multitude of teeth out of said Z-plane.

6. A method of forming holes in an article with a contoured section by electrical discharge machining comprising the steps of:
   (1) forming an electrode with a first multitude of teeth and a second multitude of teeth, the first multitude of teeth of generally equivalent length and the second multitude of teeth defining a curvature relative the first multitude of teeth;
   (2) locating the second multitude of teeth adjacent the contoured section; and
   (3) advancing the first multitude of teeth and the second multitude of teeth into the article such that a multitude of holes are formed into the highly contoured section.

7. The method as recited in claim 6, wherein said article is an airfoil.

8. A method as recited in claim 6, wherein said step (1) further comprises the step of:
   defining the first multitude of teeth and the second multiple of teeth define a contour which is generally equivalent to the contoured section of the article.

9. A method of forming holes in an article with a contoured section by electrical discharge machining comprising the steps of:
   (1) forming an electrode with a first multitude of teeth and a second multitude of teeth, the second multitude of teeth having a length variation relative to said first multitude of teeth locating the second multitude of teeth on each side of the first multitude of teeth;
   (2) locating the second multitude of teeth adjacent the contoured section; and
   (3) advancing the first multitude of teeth and the second multitude of teeth into the article such that a multitude of holes are formed into the highly contoured section.

10. A method of forming holes in an article with a contoured section by electrical discharge machining comprising the steps of:
    (1) forming an electrode with a first multitude of teeth and a second multitude of teeth, the second multitude of teeth having a length variation relative to said first multitude of teeth, maintaining the first multitude of teeth within a Z-plane and maintaining the second multitude of teeth out of said Z-plane;
    (2) locating the second multitude of teeth adjacent the contoured section; and
    (3) advancing the first multitude of teeth and the second multitude of teeth into the article such that a multitude of holes are formed into the highly contoured section.

11. A method of forming holes in an article with a contoured section by electrical discharge machining comprising the steps of:
    (1) forming an electrode with a first multitude of teeth and a second multitude of teeth, the second multitude of teeth having a length variation relative to said first multitude of teeth, curving the second multitude of teeth in a Y-plane relative the second multitude of teeth;
    (2) locating the second multitude of teeth adjacent the contoured section; and
    (3) advancing the first multitude of teeth and the second multitude of teeth into the article such that a multitude of holes are formed into the highly contoured section.

* * * * *